United States Patent
Kubota et al.

(10) Patent No.: US 8,048,815 B2
(45) Date of Patent: *Nov. 1, 2011

(54) COMPOSITE ARTICLE AND METHOD OF MANUFACTURE

(75) Inventors: Masanori Kubota, Hockessin, DE (US); Ayako Kubota, Hockessin, DE (US); Munetaka Kubota, Hockessin, DE (US); Alexander Kubota, Hockessin, DE (US)

(73) Assignee: Kubota Research, Inc., Hockessin, DE (US)

( * ) Notice: Subject to any disclaimer, the term of this patent is extended or adjusted under 35 U.S.C. 154(b) by 293 days.

This patent is subject to a terminal disclaimer.

(21) Appl. No.: 12/332,570

(22) Filed: Dec. 11, 2008

(65) Prior Publication Data

US 2009/0233508 A1   Sep. 17, 2009

Related U.S. Application Data

(60) Provisional application No. 61/012,975, filed on Dec. 12, 2007.

(51) Int. Cl.
*B32B 27/12* (2006.01)
*B32B 27/04* (2006.01)
*B32B 5/02* (2006.01)
*D02G 3/00* (2006.01)

(52) U.S. Cl. ........ 442/286; 428/364; 428/365; 428/403; 442/64; 442/66; 442/70; 442/71; 442/72; 442/108; 442/148; 442/164; 442/169; 442/170; 442/187; 442/188; 442/340; 442/394

(58) Field of Classification Search .............. 428/364, 428/365, 403; 442/108, 187, 188, 340, 394, 442/286, 64, 66, 70–72, 148, 164, 169, 170
See application file for complete search history.

(56) References Cited

U.S. PATENT DOCUMENTS

| | | | |
|---|---|---|---|
| 4,122,223 A | 10/1978 | Civardi et al. | |
| 4,151,031 A | 4/1979 | Goad et al. | |
| 4,219,457 A * | 8/1980 | Taniguchi et al. | 523/205 |
| 4,407,885 A * | 10/1983 | Murphy et al. | 442/212 |
| 4,539,253 A * | 9/1985 | Hirschbuehler et al. | 442/239 |
| 4,657,990 A * | 4/1987 | Daoust et al. | 525/471 |
| 4,737,527 A | 4/1988 | Maranci | |
| 4,770,927 A | 9/1988 | Effenberger et al. | |
| 5,128,198 A | 7/1992 | Dyksterhouse et al. | |
| 5,132,394 A | 7/1992 | Bockrath | |
| 5,626,916 A | 5/1997 | Kishi et al. | |
| 5,698,725 A | 12/1997 | Hayashi et al. | |
| 6,531,568 B1 | 3/2003 | Shibuya et al. | |
| 2002/0051882 A1* | 5/2002 | Lawton et al. | 428/378 |
| 2002/0090490 A1 | 7/2002 | Kawasumi et al. | |
| 2003/0022575 A1 | 1/2003 | Yoneda et al. | |
| 2003/0157397 A1 | 8/2003 | Barton et al. | |
| 2004/0091771 A1 | 5/2004 | Hosaka et al. | |
| 2004/0147711 A1 | 7/2004 | Christiansen et al. | |
| 2004/0231598 A1 | 11/2004 | Werner | |
| 2004/0241415 A1 | 12/2004 | Wadahara et al. | |
| 2006/0111483 A1 | 5/2006 | Mitchell et al. | |
| 2006/0235159 A1 | 10/2006 | Datta et al. | |
| 2006/0286362 A1 | 12/2006 | Kubota | |
| 2007/0014944 A1 | 1/2007 | Matsumoto | |
| 2007/0166526 A1 | 7/2007 | Myard et al. | |
| 2007/0293107 A1 | 12/2007 | Follo et al. | |

* cited by examiner

*Primary Examiner* — Norca L Torres Velazquez
(74) *Attorney, Agent, or Firm* — McCarter & English

(57) ABSTRACT

The present invention relates to a composite article and to a process for manufacturing the composite article. The composite article comprises multiple layers including high tenacity fibers incorporated into a fabric and a core thermoplastic resin. The fabric may be coated with a surface treatment agent, a polymer matrix resin. Single or multiple layers of the composite articles may be formed into a composite part having high strength, rigidity, fast molding cycle time and extremely good conformability in a 3-dimensional mold. The composite parts formed by this process have high part strength in all directions.

15 Claims, 3 Drawing Sheets

COMPOSITE ARTICLE AND METHOD OF MANUFACTURE

CROSS REFERENCE TO RELATED APPLICATION

The present application claims the benefit of U.S. Provisional Application Ser. No. 61/012,975, filed Dec. 12, 2007, the disclosure of which is expressly incorporated herein by reference in its entirety.

FIELD OF THE INVENTION

The present invention relates to a composite prepreg and to a process for manufacturing the composite prepreg. Specifically, the present invention relates to a moldable high tenacity and high modulus fibrous composite prepreg article, and methods of manufacture.

BACKGROUND OF THE INVENTION

The transportation industry, including automobile and aircraft manufacturing, continues to expand the use of fiber reinforced polymer matrix composite parts to reduce weight, emissions and improve energy consumption and noise reduction. Common automobile composite parts are made by heat compression molding a preform sheet material made from glass fiber and thermoplastic resin. The aerospace industry requires materials with high strength modulus performance and typically uses unidirectional continuous fiber reinforced thermoset composite parts or carbon reinforcement impregnated with thermoset or high melt temperature advanced thermoplastic resins.

One common method of composite manufacture uses a pre-impregnated (prepreg) material made by applying a matrix resin onto a reinforcement fiber. The matrix resin may be a thermoplastic or thermoset resin applied onto a high tenacity reinforcement fiber. The fiber may be in a non-woven fabric of short or long fiber length or a woven or unidirectional fiber configuration of continuous fiber length. One method of prepreg manufacture is to apply a thermoplastic resin onto the reinforcement fiber or fabric by dip coating the fabric into a aqueous slurry made from micro-sized thermoplastic resin powder dispersed in water. The wet powder adheres to the fabric as the water is removed by drying. A consolidated prepreg can be made at this point by heating the prepreg under pressure and above the melt temperature of the resin. An alternative process is to heat the prepreg to partially melt the resin onto the fiber reinforcement to partially impregnate the prepreg. Complete impregnation of the prepreg is done during the composite part manufacturing and consolidation step.

Composite parts can be made by layup of the prepreg, where multiple layers are laid up by hand or mechanical means in a stacked configuration where subsequent layers are stacked having a defined fiber orientation. The laid up stack can than be processed by applying pressure and heat. Thermoset prepreg is normally processed in an autoclave under controlled pressure and heat to initiate a thermal chemical reaction to cure and consolidate the prepreg into a final composite part. Thermoplastic prepreg can be processed by layup in a mold and compression molded with pressure and heat to melt the thermoplastic resin throughout the fibrous stack. When the thermoplastic prepreg reaches the softening and melt temperature of the resin, the resin will flow into the fibers in a consolidation process and the prepreg will conform to fit the mold, producing the final composite part.

Several shortcomings in performance are inherent in manufacture of the prepreg by the aqueous slurry process. The polymer resin must be milled to a 25 to 50 micron particle diameter powder size, usually by cryogenic grinding, an expensive intermediate processing step. The polymer powder at 50 microns is much larger than the reinforcement fiber bundle diameter and therefore does not effectively penetrate into and uniformly wet the fibers during prepreg consolidation, producing a final composite with inadequate mechanical performance. The reinforcement fiber surface requires a surface treatment agent so that the polymer matrix resin will wet and tightly adhere to the fiber surface in order to produce a high quality prepreg. Typically, treating the fiber surface to wet the surface and improve adhesion of the polymer matrix resin to the fiber surface is called "sizing" the fiber.

The transportation manufacturing industry is looking for new composite materials and composite molding processes that deliver light weight, high strength-stiffness parts that address the issues of manufacturing cycle time, forming and joining, crashworthiness, safety, production cost and end of life recycle or reuse capability. The present invention is directed to a lower cost and faster manufacturing process for producing prepreg that overcomes the deficiencies of the prior art.

SUMMARY OF THE INVENTION

The invention is directed to prepregs and composite articles and to a process for manufacturing same. In one embodiment, the present invention relates to a prepreg comprising a first layer having a top and bottom, wherein the first layer comprises a fabric made from high tenacity fibers coated with a surface treatment agent and polymer matrix resin; a second layer having a top and bottom, wherein the second layer comprises a thermoplastic resin having a higher melt temperature than the polymer matrix resin in the first layer, wherein the bottom of the first layer is adhered to the top of the second layer. In another embodiment, the polymer matrix resin in the first layer has a melt flow index greater than the thermoplastic resin in the second layer. In a further embodiment, the present invention relates to a manufacturing process for using the prepreg to form a composite part.

In another embodiment, the present invention relates to a 2-ply prepreg comprising a first prepreg comprising a top and a bottom, wherein the top comprises a fiber layer and the bottom comprises a thermoplastic resin layer, and a second prepreg comprising a top and a bottom, wherein the top comprises a fiber layer and the bottom comprises a thermoplastic resin layer, wherein the bottom of the first prepreg is adhered to the bottom of the second layer.

In another embodiment, the present invention relates to a method of manufacturing a prepreg comprising coating a fabric with a surface treatment agent; simultaneously or thereafter coating the fabric with a polymer matrix resin; thereafter drying the fabric; and thereafter applying a thermoplastic resin onto the fabric to form said prepreg.

In another embodiment, the present invention relates to a method of manufacturing a 2-ply prepreg comprising: coating at least two fabrics with a surface treatment agent; simultaneously or thereafter coating each fabric with a polymer matrix resin; thereafter drying each fabric; thereafter applying a thermoplastic resin onto one side of each fabric to form a prepreg; thereafter contacting two prepregs together such that the thermoplastic resin sides of the prepregs are in contact; and thereafter adhering the two prepregs together to form the 2-ply prepreg. Adhering the two prepregs comprises heating the prepregs to a temperature above the melt flow index temperatures of the thermoplastic resins.

In yet another embodiment, the present invention relates to a method of forming a composite part comprising: coating at least two fabrics with a surface treatment agent; simultaneously or thereafter coating each fabric with a polymer matrix resin; thereafter drying each fabric; thereafter applying a thermoplastic resin onto one side of each fabric to form a prepreg; thereafter contacting two prepregs together such that the thermoplastic resin sides of the prepregs are in contact; thereafter adhering the two prepregs together to form a 2-ply prepreg; and thereafter forming the 2-ply prepreg into a composite part.

BRIEF DESCRIPTION OF THE DRAWINGS

This invention is best understood from the following detailed description when read in connection with the accompanying drawings.

DETAILED DESCRIPTION OF THE INVENTION

The present invention describes the manufacture of a prepreg and composite article comprising two layers, including a fabric rich layer containing a surface treatment agent and polymer matrix resin and a second layer containing a thermoplastic resin rich layer. The manufacturing process for producing the prepreg includes applying an aqueous dispersion of a surface treatment agent applied to the fiber rich layer that enables the combination of fibers and polymer matrix resins into a broad array of prepreg products that can be thermoformed into finished composite parts exhibiting a broad range of engineering properties desirable for industry applications. The prepreg manufacturing process described in this invention is a low cost and highly productive process compared to other prepreg manufacturing processes known to the art. The prepreg manufacturing process described in this invention enables combining varied high tenacity reinforcement fibers with varied thermoplastic polymer matrix resins to tightly bond the resin to the fiber; wherein the intimate fiber to resin bonding can not be produced as a prepreg by other manufacturing processes known to the art.

The prepreg can be manufactured so that it can be thermoformed into a final composite part having a range of improved performance properties including: impact energy absorption, puncture resistance, thermal insulation, noise insulation and vibration dampening properties. Multiple plies of the prepreg can be stacked and consolidated by thermoforming to form a sandwich structure and produce a low density and high strength-stiffness composite panel. The composite fabric layer can be constructed in such a way as to absorb the stress and strain induced in 3-dimensional deep compression molding to provide a major improvement over current molding technologies. The low density and high strength composite part formed is able to meet the mechanical, physical, cycle time, environmental and recycle requirements for automobile and transportation part manufacturing.

The invention may be used to provide a high tenacity fibrous prepreg with improved molding and forming capability that can be used to fabricate composite articles in variable thicknesses and dimensions. The invention may also be used to provide a fibrous prepreg with functional properties that can be changed by applying variable thermoforming or compression processing conditions. The invention may also be used to improve multiple ply prepreg alignment during consolidation and to provide an improved deep molding capability in using multiple layers of the fibrous prepreg to make composite parts. The invention may also be used to provide a manufacturing process with improved productivity in using the fibrous prepreg to mold composite parts. Finally, the fibrous prepreg can be formed into composite parts that are readily recycled or reused.

As used herein, the following terms are defined:

"Composite" means any combination of two or more materials (such as reinforcing elements, fillers, etc., and a composite matrix binder) differing in form or composition on a macro scale. The constituents retain their identities: that is, they do not dissolve or merge completely into one another although they act in concert. Normally, the components and the components interface forming the composite can be physically identified.

'Fabric' means a cloth that can be non-woven, needled, woven, knit, or braided fibrous material, such as yarn, tow, roving, or individual fibers.

"Melt flow index" is a measurement of mass flow, commonly measured as the mass in grams of a thermoplastic resin at a temperature of 190° C. that can be forced through an extrusion rheometer orifice of 0.0825 inch diameter when subjected to a force of 2.16 kg over a time period of 10 minutes. The melt flow index, as defined here, is typically measured in accordance with ASTM D1238 standard.

"Tg" means glass transition temperature, which is the temperature below which the physical properties of amorphous materials behave in a manner similar to those of a solid phase (glassy state), and a temperature above which amorphous materials behave in a manner similar to those of a liquid phase (rubbery state).

"Heat deflection temperature" means the temperature at which a standard test bar deflects a specified distance under a load. The heat deflection temperature is typically measured in accordance with ASTM D648 standard 'Fiber' means a fundamental component used in the assembly of yarns and fabrics. Generally, a fiber is a component having a length dimension that is much greater than its diameter or width. This term includes ribbon, strip, staple, and other forms of chopped, cut or discontinuous fiber and the like having a regular or irregular cross-section. "Fiber" also includes a plurality of any one of the above or a combination of the above.

"High tenacity fiber" means that class of synthetic, glass or natural non-glass fibers having high values of tenacity greater than 10 g/denier, such that they lend themselves for applications where high abrasion and/or cut resistance is important. Typically, high tenacity fibers have a very high degree of molecular orientation and crystallinity in the final fiber structure. High tenacity fibers are preferably made from bundled filaments that are individually quite small, having a diameter of micrometers. A bundle of hundreds to thousands of filaments may be wound together to manufacture a single fiber. A single fiber may be combined with multiple fibers to make a unidirectional, woven or non-woven fabric.

"Surface treatment agent" means a chemical entity that when applied to a surface, such as the surface of the high tenacity fiber, modifies the fiber surface to make the fiber surface more amenable to physical, mechanical or chemical bonding to a polymer matrix resin coating.

"Processing temperature" means a temperature or temperature range at which a polymer emulsion or polymer slurry coating dries, softens, melts and forms a film on the fiber surface and adheres to the fiber surface.

"Melt temperature" means a temperature at which a polymer softens and changes from a solid state into a liquid state that can flow.

"Degradation temperature" refers to the temperature limit above which a polymer begins to break down and degrade into polymer molecular chain sub-components.

"Decomposition temperature" refers to the temperature limit above which a polymer or a chemical entity breaks down and decomposes into molecular sub-components such as gases and carbonized solids.

"Elastic modulus" refers to the ratio of stress, within the proportional limit, to the corresponding strain. The elastic modulus of an object is defined as the slope of its stress-strain curve in the elastic deformation region, where stress is the force causing the deformation divided by the area to which the force is applied. The strain is the ratio of the change caused by the stress to the original state of the object. The elastic modulus is normally measured in Pascals according to ASTM D3039 standard.

"Tensile" refers to the maximum stress load applied in breaking a tensile test piece divided by the original cross-sectional area of the test piece. Tensile strength is measured in pascals according to ASTM D3039 standard.

"Impact resistance" refers to the energy required to puncture a material by impact with a falling dart under specified test conditions. This test measures the multi-axial impact behavior of a material and can be used as a measure of the rate sensitivity of a material. Impact resistance is normally measured in Joules of energy according to ASTM D3763 standard.

"Strength-stiffness" refers to a measure of the material performance in terms of comparing the tensile strength to the stiffness or elastic modulus of the material. The design of the composite composition is tailored to achieve the optimum strength-stiffness performance for the application.

"Deep-mold forming" refers to molding a part with a depth of draw that is 2:1 ratio or greater. Depth of draw is measured as the ratio of the depth of the formed part compared to the width of the starting sheet of material. A typical draw is 1:1 ratio.

Figure 1:
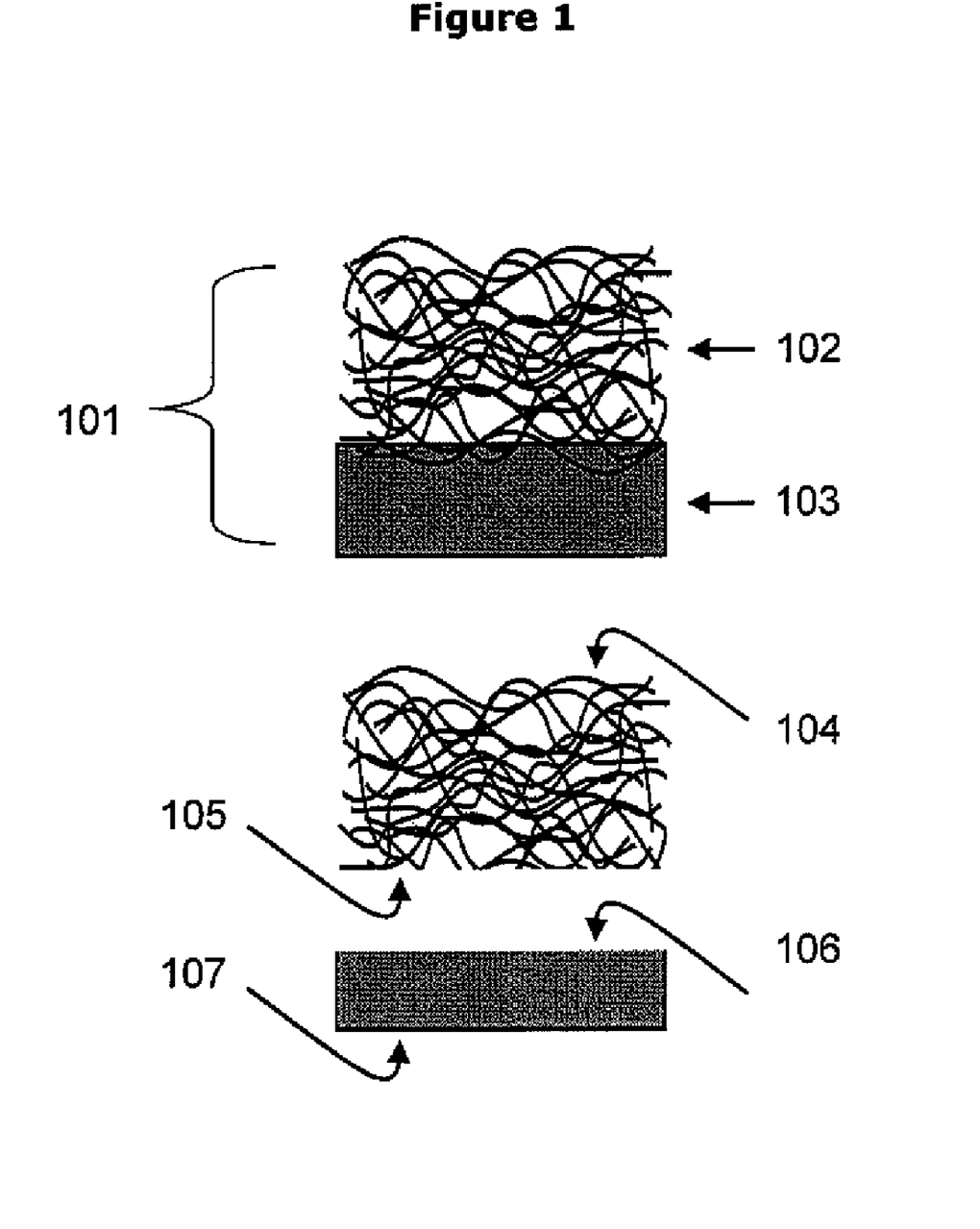
FIG. 1 shows a cross section diagram of a prepreg of the present invention.

The fibrous prepreg of the present invention preferably possesses at least two functional layers. One functional layer is a fabric rich layer and another functional layer is a thermoplastic resin rich layer. FIG. 1 shows a cross section diagram of the fiber reinforced prepreg of the present invention. The structure (101) comprises two discrete layers including a fiber rich layer (102) and a resin rich layer (103). FIG. 1 also shows the top of the fiber rich layer (104), the bottom of the fiber rich layer (105), the top of the resin rich layer (106) and the bottom of the resin rich layer (107).

The fiber rich layer composition may comprise a fabric, such as lightweight needle-punched fabric, a chopped mat fabric, a non-woven fabric, a woven fabric or a unidirectional fabric. The fabric in the fiber rich layer is coated with a surface-active agent and a polymer matrix resin. The composition of the thermoplastic resin rich layer of the invention may be a neat thermoplastic resin or a thermoplastic resin with added fiber reinforcement.

Alternatively, the fibrous prepreg may also comprise a single mixed phase comprising fibers and a thermoplastic resin layer. The fibers may be present in the form of a fabric, such as a lightweight needle-punched fabric, a mat fabric, a non-woven fabric, a woven fabric or a unidirectional fabric, that is coated with a surface-active agent and a polymer matrix resin. The thermoplastic resin layer may be a neat thermoplastic resin layer or a thermoplastic resin with added fiber reinforcement.

One embodiment of the present invention is directed to a prepreg comprising a first layer having a top and bottom, wherein the first layer comprises a fabric made from high tenacity fibers coated with a surface treatment agent and a polymer matrix resin; a second layer have a top and bottom, wherein the second layer comprises a thermoplastic resin, wherein the bottom of the first layer is bound together with the top of the second layer, wherein the polymer matrix resin in the first layer has a melt temperature lower than and a melt flow index greater than the thermoplastic resin in the second layer.

Figure 2:
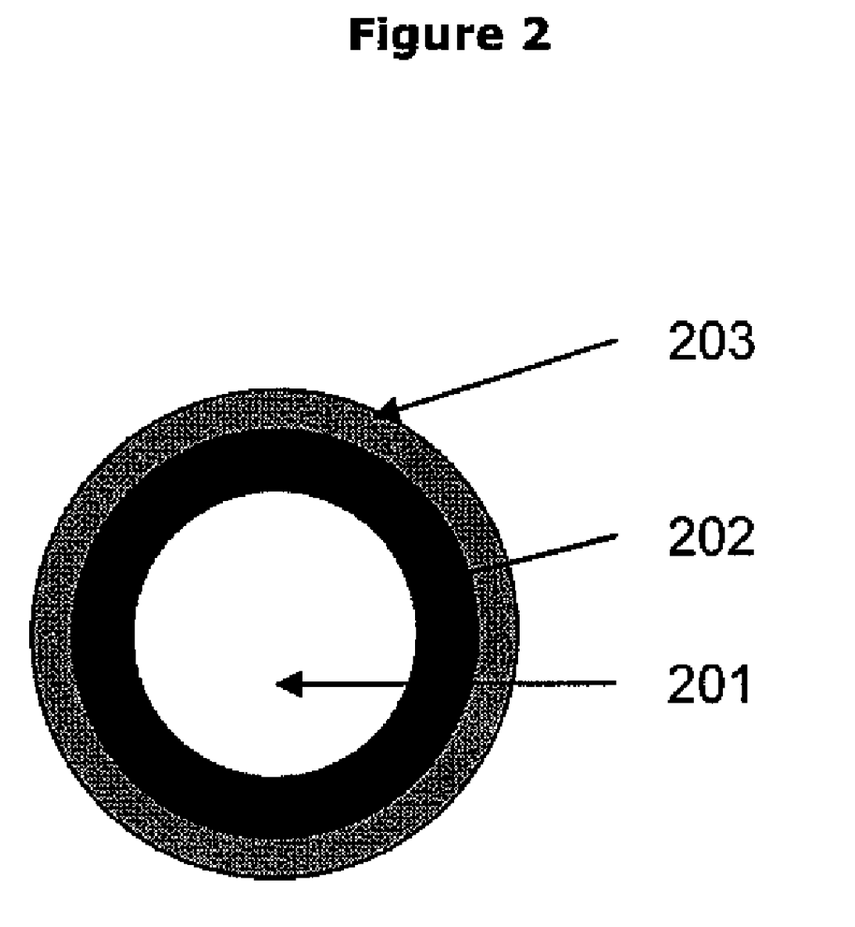
FIG. 2 shows a cross section diagram of a fiber coated with a surface treatment agent and a polymer matrix resin.

FIG. 2 shows a cross section diagram of a single fiber showing bonding to the fiber surface (201) of a surface treatment agent and a polymer matrix resin. The first coating (202) preferably is a nano-scale aqueous dispersion of a surface treatment agent. The first coating is applied to the fiber surface so that it will intimately bond or adhere to the second coating (203) that preferably is a micrometer-scale aqueous dispersion of a thermoplastic polymer matrix resin applied to the fiber. The first and second coatings applied to the fiber may be applied sequentially as separate coating solutions or simultaneously as a single coating solution mixture.

After coating, the fibers, fabric or prepreg may be heated to a processing temperature that first dries and removes the water from the surface treatment agent and polymer matrix resin coating, so as the water is removed the agent and resin adhere to the fiber. The fibers, fabric or prepreg is than heated to a processing temperature that melts the surface treatment agent and polymer matrix resin coating onto the fiber surface to tightly bond to the fiber surface. The surface treatment agent and/or the polymer matrix resin may be melted on the fiber surface as a result of exposure to a heat treatment process above the melt temperature of the surface treatment agent, the polymer matrix resin or both. Preferably, the melt temperature for the surface treatment agent and polymer matrix resin is greater than the decomposition temperature of any surfactant used in the surface treatment agent and polymer matrix resin dispersion coatings on the fibers and the temperature is sufficient to substantially decompose the surfactant during the melting process. The melt temperature for the surface treatment agent and polymer matrix resin is preferably less than the degradation temperature of the reinforcement fibers.

A suitable fiber for the production of the fabric and/or reinforcement fibers used in the prepreg can be any high tenacity fiber commonly used as fiber reinforcement in the manufacture of prepregs and composites. A high tenacity inorganic fiber may be selected from the group consisting of carbon, glass, silicone carbide or basalt. (See U.S. Patent Application No. 2004/0241415 and U.S. Pat. No. 6,984,445, both of which are hereby incorporated by reference in their entirety). A high tenacity organic fiber may be selected from the group consisting of polyarylate, liquid crystal polyarylate, poly-p-benzamide, poly-paraphenylene terephthalamide, poly-(p-phenylene-2,6-benzobisoxazole), meta-linked aromatic polyamide, or high-density polyethylene fibers.

Fibers are typically manufactured from filaments that are bundled into fiber bundles. The number of filaments in a fiber bundle varies depending on the strength and stiffness requirements of the fiber application. The diameter of the filament used in making a high tenacity fiber is typically in the range of about 1 to about 50 micrometers, preferably in the range of about 5 to about 30 micrometers. The fibers can be combined in the form of a fabric.

The fibers of the present invention may be used in various forms and applications. Continuous fibers can be woven into a fabric or incorporated into unidirectional continuous fiber tape. The fibers are preferably treated with a surface treatment agent and then coated with polymer matrix resin to form a fabric or tape representing the first layer (102) of the prepreg composite. The fibers can be cut into non-continuous fibers and incorporated into a non-woven fabric such as a mat fabric. The non-woven fabric may then be treated with a surface treatment agent and then coated with a polymer matrix resin to form a mat fiber rich layer of the prepreg. Cut fibers can be needle-punched into a non-woven randomly placed fabric. This fabric may then be treated with a surface treatment agent and then coated with a polymer matrix resin to form a non-woven low bulk density first layer of the prepreg.

Typically, fibers supplied from the fiber manufacturer have a fiber surface that is coated with oil used to lubricate the fiber surface for post processing such as weaving. During preparation for the manufacture of a prepreg composite, the fibers are preferably first washed to remove the oil and than surface treated with a surface treatment agent to optimize the surface contact or wetting of the fiber before the polymer resin is applied. The polymer matrix resin may typically not be chemically compatible with the raw fiber and will not readily wet the surface of the raw fiber without the use of a pretreatment. Pretreatment of the fiber with a surface treatment agent is typically called sizing. Prepregs made with non-treated fiber will tend to have weak fiber bonding to the polymer matrix resin interface and produce prepreg and final composite material that have non-uniform and lower performance mechanical and physical properties.

In the present invention, the fibers are coated with a surface treatment agent. Preferably, the coating is in the form of a nano-particle resin dispersed in an aqueous or non-aqueous dispersion. The nano-particle resin dispersion particle size is less than about 1 micrometer in diameter, preferably less than about 0.5 micrometers and more preferably less than about 0.1 micrometers. The particle size diameter of the surface treatment agent is preferably chosen to be equal to or less than ⅓ of the diameter of the filaments used to make up the fibers in the fabric so that the nano-particle dispersion can easily migrate into and between the micron-scale diameter fibers and coat the fibers in the fabric.

Typical surface treatment agents or sizing chemicals used in the industry for pretreatment of fibers in the manufacture of prepregs and composites include silyl resins, silyl-dimethacrylate, siloxane bond resins and silane coupling agents.

In the present invention, the surface treatment agent composition is a nano-particle dispersion preferably made from a polymer resin dispersed in water for application and adherence to a fiber or fabric. Suitable polymer resins that can be used as a surface treatment agent may be one or a blend of the following polymers: a polyamide/epoxidized styrene-butadiene block copolymer, ethylene glycidyl methacrylate copolymer, co-polypropylene, polyethylene terephthalate, co-polyester, epoxy, polymethacrylate iso-butylester, polymethacrylic n-butylester, butyl methacrylate-styrene copolymer, polymethylmethacrylate, polyamide, co-polyamide, polyvinyl acetate, polyvinyl alcohol, polyethylene, polyurethane, thermoplastic polyether-polyurethane, EMMA (ethylene-methyl methacrylate copolymer), EMMA ionomer, and polyetheretherketone.

The surface treatment agent is preferably selected for optimum compatibility and bonding of the reinforcement fiber surface to the polymer used in the polymer matrix resin. Table 1 provides a list of surface treatment agents and their respective compatibility with polymers in selected polymer matrix resins to make prepregs in the present invention. Note that this list represents a partial list of examples and is not inclusive of all nano-particle polymers in aqueous dispersion surface treatment agents that can be used in this invention.

TABLE 1

| Surface-Treatment Agent | | Polymer Matrix Resin | | | | | | | | | | | | | | |
|---|---|---|---|---|---|---|---|---|---|---|---|---|---|---|---|---|
| Chemical Name | Dispersion | PP | PE | PET | PA | TPU | PEMA | PMMA | PC | PS | PES | PPS | PEI | TPI | PEK* | Ionomer |
| Co-polyamide | PA-200 | | | PET | PA | TPU | PEMA | PMMA | PC | PS | PES | PPS | | | PEK* | |
| Modified polyolefin | SB-1200 | PP | PE | PET | PA | | | | PC | | | | | | | |
| Ethylene Glycidal Methacrylate Co-polymer | G-118 | PP | PE | PET | | | | | PC | PS | | | | | | |
| Ionomer | S-100 | | | | PA | | PEMA | PMMA | | | | | | | | Ionomer |
| Polyetheretherketone | Vicote 804 | | | | | | | | | | | | PEI | TPI | PEK* | |
| Polyether polyurethane | UA-310 | | | | | TPU | | | | | PES | PPS | | | | |

NOTES:
Polypropylene (PP), Polyethylene (PE), Polyethylene Terephthalate (PET), Polyamide (PA), Thermoplastic polyurethane (TPU), Polyethylmethacrylate (PEMA), Polymethylmethacrylate (PMMA), Polycarbonate (PC),, polystyrene (PS), Polyethersulfone (PES), Polyetherimide (PEI), Thermoplastic Polyimide (TPI), Ionomer, and Polyetherketones (PEK*): Polyetherketone (PEK), Polyetherketoneketone (PEKK), Polyetheretherketone (PEEK), All of the surface treatment agents in Table 1 are in the form of nano-particle polymer aqueous dispersions except UA-310. UA-310 is dispersed in an aqueous solution that also contains N-methyl pyrrolidone (NMP) at a low concentration. PA-200 co-polyamide is commercially available from Sumitomo Chemical Co. SB-1200 is a modified polyolefin is commercially available from Unitika Ltd. G-118 ethylene glycidyl methacrylate co-polymer is commercially available from Sumitomo Chemical Co. S-100 Ionomer is commercially available from Mitsui Chemical Co. VICOTE® 804 PEEK emulsion is commercially available from Victrex Co. UA-310 thermoplastic polyether polyurethane is a nano-particle dispersion in water and NMP and is available from Sanyo Chemical Co.

Multiple processes may be used to manufacture the multiple layer prepreg structure of the present invention. In one embodiment, the fabric rich layer is coated sequentially with a surface treatment agent and a polymer resin matrix.

A surface treatment agent aqueous dispersion can be applied onto the fabric by dip coating or other methods of liquid coating known to the industry and than the fabric is dried. The amount of dispersion on the dried fabric is typically about 5% to 20% by volume of resin.

The drying conditions used to dry the fabric containing the surface treatment agent can be graduated. For example, an initial drying stage may be used at a temperature below the melt point of the agent used and also below the boiling point of any liquid (aqueous or solvent) used in the coating solution. Liquids that may be present include, but is not limited to, water and volatile organic compounds. A drying temperature between about 50° C. and about 60° C. is preferred to remove moisture (e.g. water) and volatile organic compounds in a first drying stage.

A second drying stage may be used at a temperature above the softening or filming temperature of the nano-particle resin in the dispersion. A drying temperature between about 150° C. and about 250° C. is preferred. The surface treatment agent may form a film and adhere to the fiber surface during this drying step.

After the surface-active agent is coated onto the fiber rich layer, a second coating of polymer matrix resin can be coated onto the fiber rich layer. The polymer matrix resin layer may comprise any matrix resin known in the industry or commonly used in the manufacture of prepregs and composites. The polymer matrix resin may be a thermoplastic polymer layer formed from a material selected from the group consisting of polyethylene, polypropylene, polyethylene terephthalate, ionomer, polyamide, polyurethane, polyethylmethacrylate, polymethylmethacrylate, polycarbonate, polystyrene, polyetherketone (PEK, PEKK, PEEK), polyether sulfone, polyphenylene sulfide, polyester amide, polyetherimide and polyimide.

The polymer matrix resin coating may be applied to the surface treated fibers from a micron-scale dispersion of the polymer matrix resin powder from an aqueous or non-aqueous slurry. This thermoplastic powder may have a median particle size that is less than about 200 micrometers, preferably less than about 50 micrometer, and more preferably less than about 30 micrometers in diameter. A dispersion prepared with a polymer matrix powder that is less than 30 microns diameter will typically exhibit uniform flow onto the fibers in coating a fabric. A dispersion prepared with a polymer matrix powder that is greater than about 30 to about 50 micrometers in diameter will still effectively coat a fabric, however, it will typically exhibit less uniform flow. A larger particle size dispersion may not flow as smoothly and may appear bulky or clumpy. Therefore, industrial manufacturing processes may prefer the smaller particle size dispersions which flow better and may coat fabrics in a shorter time, under processing conditions using less agitation or lower temperatures, or combinations thereof.

A polymer matrix resin dispersion can be applied onto the fabric already containing the surface active agent by dip coating or other methods of liquid coating known to the industry and than the fabric is dried. The amount of polymer matrix resin on the dried fabric is typically about 10% to 50% by volume of resin, depending on the fabric configuration and the prepreg application.

The polymer matrix resin on fabric may be dried using a graduated process. The first drying stage is at a temperature of about 50° C. to 60° C. to remove the liquid. For example, an initial drying stage may be used at a temperature below the melt point of the matrix resin used and also below the boiling point of any liquid (aqueous or solvent) used in the coating solution.

A second drying stage may be used at a temperature about 50° C. to 100° C. above the melt temperature of the nano-particle surface treatment agent and polymer resin material to melt the resins onto and tightly bond to the fibers of the fabric rich layer.

A small amount of surfactant is used to stabilize the aqueous dispersion in the manufacture of each of the surface treatment agents listed in Table 1. Residual surfactant is not desirable in the prepreg or final composite composition because the residual surfactant may act as a hydrophilic chemical and accelerate the absorption of water by the prepreg or composite. Preferably, the prepreg or final composite composition is substantially free of any residual surfactant. The present invention may include a processing temperature to melt the surface treatment agent set to be greater than the decomposition temperature of any residual surfactant that might be present in the drying process. Decomposition of the residual surfactant removes potential water absorption sites in the composition and minimizes prepreg or composite water absorption.

For example, amine oxide surfactants and azodicarbonamide (ABFA) are two surfactants commonly used in producing nano-particle polymer dispersions. Amine oxide surfactants typically decompose at a temperature of less than about 200° C. Azodicarbonamide (ABFA) surfactant has a decomposition temperature between 204° C. and 213° C. The heat processing step to melt the nano-particle resin in the surface treatment agent and to melt the polymer matrix resin is preferably done at a temperature that is about 50° C. to 100° C. greater than the melt temperature of the nano-particle resin or polymeric matrix resin material. This temperature is typically above 200° C. and preferably above 220° C. and most surfactants present will decompose during the heat processing of the surface treatment agent. Moreover, the processing temperature to melt the surface treatment agent is preferably less than the decomposition temperature of the fiber/fabric.

Preferably, the polymer matrix resin may have a processing temperature for drying and melting onto the fiber/fabric that is greater than the decomposition temperature of the surfactant present in the dispersion so that the surfactant decomposes during the heating and melting process. Preferably, the polymer matrix resin has a processing temperature for drying and melting onto the fiber/fabric that is less than the degradation temperature of the fiber.

As shown in FIG. 1, a second thermoplastic resin rich layer (103) is applied to the fabric rich layer to produce the prepreg. The resin rich layer is preferably formed by application of a thermoplastic resin onto the fabric rich layer by a high speed process. One advantage of the present invention is the ability to use high speed processes to make the prepregs of the present invention with superior qualities. High speed processes include, but are not limited to, melt extrusion and film lamination.

Suitable thermoplastic resins that can be used as the second layer may be one or a blend of the following polymers: polyethylene (PE), polypropylene (PP), polystyrene (PS), polyethylene terephthalate (PET), polyamide (PA), thermoplastic polyurethane (TPU), polyethylmethacrylate (PEMA), polymethylmethacrylate (PMMA), polycarbonate (PC), polyethersulfone (PES), polyetherimide (PEI), thermoplastic polyimide (TPI), polyphenylenesulfide (PPS), and polyethers (PEK), (PEKK), (PEEK).

The thermoplastic resin is chosen for application onto the fiber rich layer based upon the surface treatment agent as shown in Table 1. The resin may be selected based on compatibility so as to improve adhesion where the bottom of the fiber layer is wetted and bonded to the top of the resin rich layer as shown in FIG. 1.

The prepreg of the present invention may have a weight ratio of fiber rich layer to core thermoplastic layer ranging from 1:20 to 20:1. The weight percent of fiber rich layer in the prepreg is greater than 5% by weight. Preferably, the weight percent of fiber rich layer in the prepreg is greater than 10% by weight. More preferably, the weight percent of fiber rich layer in the prepreg is greater than 20% by weight.

In an alternative method to manufacture the prepreg, the fabric rich layer may be coated simultaneously with a blend of the surface treatment agent and the polymer matrix resin dispersion.

In this method, a surface treatment agent nano-particle dispersion and polymer matrix resin micro-particle dispersion that are compatible as shown in Table 1 are selected and blended together to make a single coating dispersion.

It is expected that the nano-particle surface active agent will substantially and/or completely penetrate the fabric and coat individual fibers to enable stronger bonding of the polymer matrix resin than available from traditional methods. The polymer matrix resin, having larger micro-particles will be more concentrated on the fabric surface and melt onto the fabric fibers upon heat drying.

The blended dispersion of surface active agent and polymer matrix resin can be coated onto a fabric by dip coating or other methods of liquid coating known to the industry and than the fabric is dried. The amount of total surface active agent and polymer matrix resin on the dried fabric is typically about 10% to 50% by volume of resin, depending on the fabric configuration and the prepreg application.

The fabric may be dried using a graduated process. The first drying stage is at a temperature of about 50° C. to 60° C. to remove the liquid. For example, an initial drying stage may be used at a temperature below the melt point of the matrix resin used and also below the boiling point of any liquid (aqueous or solvent) used in the coating solution.

A second drying stage may be used at a temperature about 50° C. to 100° C. above the melt temperature of the nano-particle surface treatment agent and polymer resin material to melt the resins onto and tightly bond to the fibers of the fabric rich layer.

The fabric rich layer containing the agent and resin treatment can be extrusion coated with the thermoplastic resin layer as previously described to manufacture the prepreg.

In another embodiment, the present invention is directed to the manufacture a prepreg. In one example, the extrusion coating of the thermoplastic resin rich layer may be done using a die extruder that is set to coat a resin layer thickness of between 25 microns and 100 microns thickness onto the fabric layer. Prepregs made with coatings of this thickness can be stacked and consolidated under heat and pressure to produce a composite with a uniform distribution of resin throughout the consolidated fabric and without voids.

Alternatively, the thermoplastic resin rich layer may contain fiber reinforcement to increase the overall mechanical performance of the prepreg. Chopped or preformed fibers with lengths ranging from about 5 to 250 mm, preferably about 10 to 200 mm, and more preferably about 70 to 150 mm can be used as reinforcement. In a preferred embodiment, the fibers are substantially uniformly dispersed into the resin matrix using known techniques, such as extrusion blending using a low energy extrusion coating process. For example, the TPF (THERMOPLASTIC FLOWFORMING™) extrusion coater process developed by LRM Industries, LLC may be used. Any fiber used in the industry for reinforcement of composites and prepregs may be used, including the high tenacity fibers disclosed herein. VECTRAN® HT fibers are a preferred reinforcement fiber. Fiber reinforcement may be added at an amount less than 30%, preferably less than about 20%, and more preferably less than about 10% by weight in the thermoplastic resin rich layer to optimize mechanical performance of the prepreg and composite. The resin rich layer containing the reinforcement fibers is applied to the fabric rich layer to manufacture the prepreg.

In another embodiment, the present invention relates to a 2-ply prepreg comprising: a first prepreg with a top and a bottom, wherein the top is the non-woven fiber layer and the bottom is the core thermoplastic resin layer; and a second prepreg with a top and a bottom, wherein the top is the non-woven fiber layer and the bottom is the core thermoplastic resin layer, wherein the bottom of the first prepreg is bound together with the bottom of the second prepreg.

Figure 3:
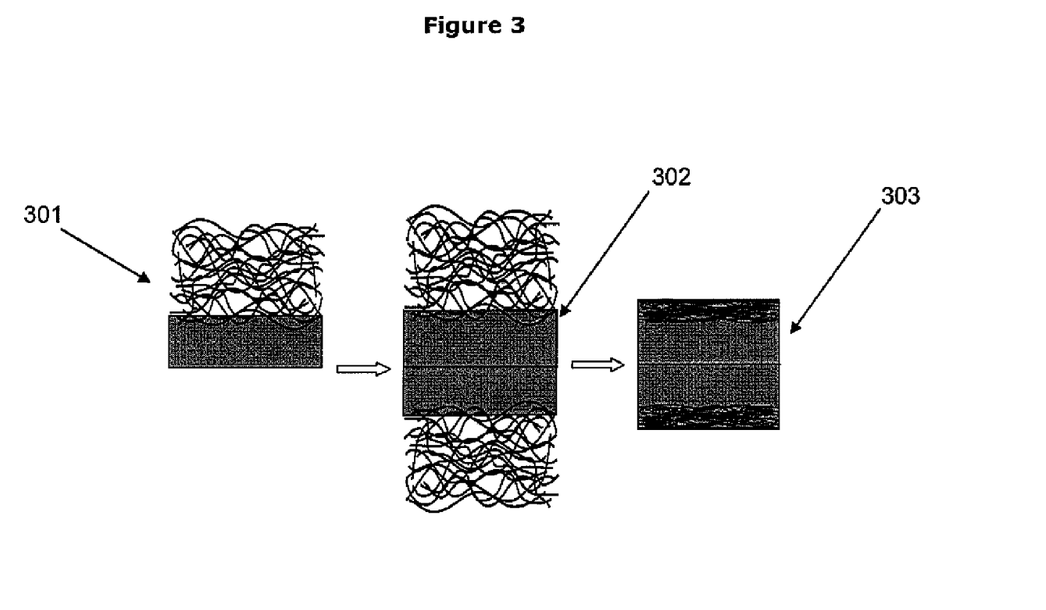
FIG. 3 shows a cross section diagram of a 2-ply composite prepreg or thermoforming prepreg.

An example of a 2-ply prepreg is shown in FIG. 3. A first prepreg (301) is stacked onto a second prepreg by placing the core resin layers face to face (302). The prepregs are made from a non-woven fabric and preferably are non-directional when stacked. The 2-plies of prepreg may be bonded by heating the prepregs to a temperature above the Tg and/or melt flow index of the prepreg core resin(s) layers.

Multiple manufacturing processes may be used to transform prepregs of the present invention into a composite.

In one embodiment, the present invention relates to a method of manufacturing a 2-ply prepreg comprising: coating a non-woven fabric with a surface treatment agent; simultaneously or thereafter coating the non-woven fabric with a polymer matrix resin; thereafter drying the non-woven fabric; thereafter applying a core thermoplastic resin onto one side of the non-woven fabric to form a prepreg; thereafter stacking two prepregs together such that the core thermoplastic resin sides of the prepregs are in contact; and thereafter bonding two prepregs together to form a 2-ply prepreg.

In the method of manufacturing the 2-ply prepreg, the bonding of the two prepregs may be achieved by heating the prepregs to a temperature above the melt flow index temperatures of the core thermoplastic resins being bound together.

The prepregs described in this invention are designed to produce a composite with high formability in thermoform part manufacture. In one embodiment, shown in (303), the present invention relates to a method of forming and molding a composite part comprising: coating a non-woven fabric with a surface treatment agent; simultaneously or thereafter coating the non-woven fabric with a polymer matrix resin; thereafter drying the non-woven fabric; thereafter applying a core thermoplastic resin onto one side of the non-woven fabric to form a prepreg; thereafter stacking two prepregs together such that the core thermoplastic resin sides of the prepregs are in contact; thereafter bonding two prepregs together to form a 2-ply prepreg; and thereafter molding the 2-ply prepreg to form a composite part.

The prepreg of the present invention may be formed into a part by pre-heating the prepreg and/or pressing it under vacuum assisted compression into a mold. Multiple layers of the prepreg can be stacked without regard to fiber direction. The stacked prepreg may have a thick fiber layer that allows extended fabric mobility, can conform to the shape of the mold and can be thermoformed into a deep form mold without causing bridging, fiber breaking or fabric reinforcement thinning at the corners of the mold. The two-layer prepreg configuration of the invention enables the prepreg to form uniform high strength and high modulus composite parts in 3-dimensional forms using a high-speed thermoforming process without using expensive continuous fabric reinforcement.

The prepreg and/or 2-ply prepreg may be used to form a composite part. The prepregs may be compressed under elevated temperatures and/or pressures in a mold in a thermoforming process. Vacuum assisted thermoforming may be used, and may work best for high productivity in forming parts. The formed 2-ply prepreg (303), and resultant composite part, has a fiber rich layer on the outside enclosing the core resin layer. The lightweight and low-density part formed will have high strength and stiffness, high impact resistance and can be produced in a fast cycle time manufacturing process.

In one embodiment, composites of the present invention are lightweight with high strength and stiffness while using a relatively minimal amount of fiber reinforcement. This combination makes the final part cost competitive with other lower strength thermoformable panels. The formed composite parts of the present invention and high part strength to weight performance and may be similar to continuous fiber reinforced parts but with a faster manufacturing cycle time and at lower material cost. The prepregs of the present invention may be used in deep mold and tight corner or sharp angle thermoforming mold applications without bridging, breaking fiber or wrinkling issues. The two-layer prepreg configuration enables the prepreg of the present invention to form uniform high strength and high modulus composite parts in 3-dimensional forms using a high-speed thermoforming process and without using expensive continuous fabric reinforcement.

The prepreg composition can be molded into composite parts, typically used for, but not limited to, the manufacture of automobile parts, such as a door panel, fender, roof, engine hood, headliner, trunk lid, trunk liner or passenger compartment component parts. The composition can also be used to mold composite parts used as non-structural aircraft and aerospace parts. The composites can also be molded to manufacture luggage, sporting goods and filtration products.

Applicants specifically incorporate the entire content of all cited references in this disclosure. Further, when an amount, concentration, or other value or parameter is given as either a range, preferred range, or a list of upper preferable values and lower preferable values, this is to be understood as specifically disclosing all ranges formed from any pair of any upper range limit or preferred value and any lower range limit or preferred value, regardless of whether ranges are separately disclosed. Where a range of numerical values is recited herein, unless otherwise stated, the range is intended to include the endpoints thereof, and all integers and fractions within the range. It is not intended that the scope of the invention be limited to the specific values recited when defining a range.

EXAMPLES

Example 1

A 3-dimensional non-woven fabric structure for use in the present invention may be produced using the preferred fibers by known techniques in the industry, such as needle punching. Preferably, long fiber fabric is used. Long fiber fabric will maximize tensile and impact absorption properties of the prepreg and the composite. For example, fiber lengths that may be used to produce fabrics of the invention are approximately 0.5 to 500 mm, preferably about 10 to 300 mm, and more preferably about 50 to 100 mm in length.

The fibers may be also be obtained by cutting a long fiber into shorter fibers. The fibers may be arranged, such as by being needle-punched, into a 3-dimensional non-woven fabric that is substantially non-directional. Needle-punched fabric is typically made by mechanically binding the fibers in a web to form a fabric and by penetrating the web with an array of barbed needles that carry tufts of fibers in a vertical direction through the web. The fabric of the present invention may have a density of less than 1,000 $Kg/m^3$, preferably less than 500 $Kg/m^3$, and most preferably less than 100 $Kg/m^3$. The thick needle-punched fabric may be combined with the resin rich layer to form a prepreg that is non-directional and that can be stacked without layer orientation concerns. In a preferred embodiment, the first layer may contain an ultra low-density non-woven needle-punched fabric with fiber lengths longer than 40 mm (1.5 inches) and/or a bulk fabric density less than 100 $Kg/m^3$.

In a preferred embodiment, the high tenacity non-woven fabric can be made by first cutting or otherwise pre-forming a high tenacity fiber into lengths that are 75 mm or greater. The cut or preformed fibers may then be used in a needle-punching manufacturing process to form an extremely low density non-woven fabric that is about 5 mm to about 6 mm thick and made with substantially randomly placed fibers.

A Vectran™ HT fiber having 1500 dtex and 600 filament count was acquired from Kuraray Inc. and chopped to 75 mm length and needle punched to form a non-woven fabric with an areal weight of 110 g/m2 and thickness of 4 mm. The fabric was washed and dried.

The fabric was dip coated into a nano-particle aqueous dispersion of UA-310 polyether-polyurethane (TPU) to intimately coat the fibers in the fabric. The UA-310 dispersion acted as both the surface treatment agent and polymer matrix resin.

The coating was dried at 50° C. to remove the water and further dried at 230° C. to adhere the TPU onto the Vectran™ to produce a fabric rich layer with a 20% volume of resin. The melting point temperature of the TPU is 140° C. to 150° C.

The treated fabric was extrusion coated with a 75-micrometer thick layer of thermoplastic polyether-polyurethane as a resin rich layer that adhered strongly to the fabric layer to form a prepreg.

One ply of the prepreg was compressed in a press at 230° C. to form a low density composite plaque containing 50% by volume resin.

Example 2

A VECTRAN® plain weave fabric with an areal density of 260 $g/m^2$ was washed and dried. The fabric was placed in the feed roller on a die extrusion coater. A polyamide (PA12) resin, commercially available from Arkema, Inc., was extrusion coated as a 125 micrometer thickness film directly onto the VECTRAN® fabric to try and prepare a Vectran/PA12 prepreg directly.

Approximately 5 meters of 40" wide VECTRAN® was coated with the PA12 resin. The end of the 5 meter sample had PA12 film and fabric ends. The ends were pulled apart manually and the PA12 film pulled off of the VECTRAN® fabric and did not adhere to the fabric.

Example 3

A VECTRAN® plain weave fabric with an areal density of 260 $g/m^2$ from Example 2 was dip coated into PA-200 co-polyamide (commercially available from Sumitomo Chemical Company) and dried at 50° C. The PA-200 acts as a surface treatment agent. The second drying stage condition for the PA-200 co-polyamide dispersion containing co-polyamide nano-particles is about 230° C. to uniformly melt the co-polyamide dispersion onto the fiber. The PA-200 co-polyamide particles have a melt point temperature between about 145° C. and 150° C.

A polyamide (PA12) resin, commercially available from Arkema, Inc., was extrusion coated onto the pretreated fabric to produce a prepreg. The VECTRAN® liquid crystal polyarylate fibers have a very low surface activity and normally would not adhere to a polyamide, as shown in Example 2. The PA-200 optimized the intimate bonding of the polyarylate fiber surface to the thermoplastic resin matrix coating. The PA12 extrusion coating bonded tightly to the fabric to make a prepreg.

Example 4

A blend of a PA-200 co-polyamide and polyamide 6 (PA6) dispersion containing 700 nanometer particles of co-polyamide and 20 micrometer particles of polyamide 6 (PA6) was coated onto the VECTRAN® HT needle punched fiber from Example 1. The fabric was dried at 50° C. to remove water. The second drying stage condition for the PA-200/PA6 blend is about 260° C. to uniformly melt the co-polymer blend onto the fiber. The PA-200 co-polyamide particles have a melt point temperature between about 145° C. and about 150° C. The polyamide 6 (PA6) particles have a melt point temperature of about 260° C.

In another embodiment, the present invention relates to a method of manufacture of a prepreg comprising: coating a non-woven fabric with a surface treatment agent; simultaneously or thereafter coating the non-woven fabric with a polymer matrix resin; thereafter drying the non-woven fabric; and thereafter applying a core thermoplastic resin onto the non-woven fabric to form the prepreg.

The fiber and polymeric media selected may be fabricated into a two layer structured high tenacity reinforced thermoplastic prepreg. The polymeric media used in fabrication of the first and second layer of the prepreg may be selected to engineer a prepreg that forms a composite with discreet mechanical and physical properties. High tenacity fibers of lengths that are greater than 10 mm are used to make a high tenacity non-woven fabric. Cut fibers may be used in the manufacturing process to form an extremely low-density non-woven fabric with substantially or completely randomly placed fibers. The non-woven fabric may be dipped into a polymer dispersion to wet the fabric and form the first layer of the prepreg. On dip coating the fabric, the polymer chemistry in the dispersion solution intimately wets the surface of the fibers in the fabric and acts as a sizing solution. A second layer of thermoplastic polymer powder material may be applied to the wet fibers. The thermoplastic powder may be dispersed in an aqueous solution and applied as the second coating or the powder may be dispersed in the polymer sizing chemistry solution and applied at the same time as the part of the first fiber coating. The non-woven fabric with the two dispersion polymer coatings applied may be dried and the coated polymers adhere and bond to the surface of the fibers in the fabric. The polymer coating may be dried using infrared radiation or hot air convection drying of the fabric structure. The drying is done without compressing the fabric structure.

A second layer of the prepreg may be formed by extrusion of a thermoplastic layer onto the fabric surface of the first layer. This may be done with compression or without compression of the fabric structure in the first layer. During extrusion, the second thermoplastic layer may be in a molten form. The surface fibers of the fabric layer may be wetted at the interface with the molten extruded thermoplastic layer and will preferably adhere to the thermoplastic layer forming a 2-layer structure prepreg. After cooling, the fabric layer may be tightly bound at the surface interface with the thermoplastic layer.

Polyamide polymers are preferred resin matrix polymers for both the fiber rich layer (102) and the resin rich layer (103) of the prepreg because they have the high mechanical strength and good physical performance required for use in the transportation segment, especially in automobile part applications. Selected properties of polyamide polymers are shown in Table 2. The polyamide resins have a melt temperature range of 182° C. to 280° C. and can be combined with fiber reinforcement to produce composites with heat deflection values above 200° C. to avoid sagging in large horizontal surface part applications. The polyamide resin has a density range of 1.02 to 1.14 g/ml and can be combined with fiber reinforcement to provide a low specific mass composite to reduce body weight. The polyamide polymer backbone has reactive side chain groups that can bond with the sizing chemistry to pre-treat the reinforcement fiber and get high wetting compatibility in forming the prepreg. Polyamides are known for their high chemical resistance for use in auto manufacturing and are included as one of the seven types of thermoplastic polymers currently used in automobile production that can be recovered during recycling.

TABLE 2

|  | S.G. g/ml | TG (° C.) | Melt Point (° C.) | Moisture Regain (%) | Service Temp. (° C.) | Thermal Conductivity W/m-K | Elongation at Break (%) | Izod Impact, Notched, Low Temp (J/cm) |
|---|---|---|---|---|---|---|---|---|
| PA-66 | 1.14 | 50 | 265 | 2.3-7.0 | <165 | 0.25-0.28 | 4.8-300 | 0.23-0.35 |
| PA-6 | 1.14 | 48 | 225 | 2.5-8.0 | <185 | 0.17-0.30 | 7-460 | 0.16-0.21 |
| PA-11 | 1.04 | 37 | 187 | 0.9-1.9 | <160 | 0.23-0.35 | 30-400 | 0.26 |
| PA-12 | 1.02 | 50 | 176 | 0.7-1.6 | 45-145 | 0.20 | 6-395 | 0.21-1.10 |

Preferably, PA-200 dispersion can be used as the surface treatment agent as the first fabric coating layer as shown in Example 2 and 3. Preferably, the polymer matrix resin is a polyamide 11 (PA11), available from Arkema Inc., used as the preferred resin matrix to impregnate the fiber rich layer (102). PA11 has a slightly lower melt temperature and slightly high melt flow index than PA6, one of the preferred thermoplastic resin rich layer polymers.

The PA11 polymer powder may be mixed with the sizing chemistry in an aqueous solution and applied to the needle-punched fabric at a 30% to 70% by weight concentration. Preferably, the PA11 polymer powder is mixed with the sizing chemistry in an aqueous solution and applied to the needle-punched fabric at a 45% to 55% by weight concentration. Most preferably, the PA11 polymer powder is mixed with the sizing chemistry in an aqueous solution and applied to the needle-punched fabric at a 50% by weight concentration. Preferably, the resin concentration should be sufficient to fully saturate the fabric during heat compression to produce a uniformly smooth surface finish on the composite part.

PA11 has excellent melt flow properties and will flow onto the fabric fibers and saturate the fabric to form a fiber rich layer (102) that encloses the resin rich layer (103) during thermoforming. PA11 has a low moisture regain value and will prevent the core resin from absorbing moisture after thermoforming. PA11 also has high impact resistance at low temperatures and high chemical resistance, making it a good choice to meet the performance needs for automobile part applications. The non-woven fabric with the two dispersion polymer coatings applied may be dried using infrared radiation or hot air convection heat. The coated polymers adhere and bond to the surface of the fibers in the fabric and can be melt bonded with or without compressing the fabric structure.

Preferably, the thermoplastic resin rich layer is a polyamide. Polyamide 6 (PA6) may be used to form the resin layer (103) and be applying to the fiber rich layer (102) during manufacture of the prepreg (101). PA6 has a higher melt temperature and lower melt flow index than the PA11. In one embodiment, when the prepreg is heated in the thermoforming process, PA11 in the fiber rich layer will melt and flow into the fibers and into the mold shape more rapidly than PA6 core layer because of the melt and flow differential. This will produce excellent mold conformity while maintaining some rigidity in the composite. The PA6 combined with VECTRAN® has a heat deflection temperature above 200° C. and a coefficient of thermal expansion less than that of automobile body steel, producing a composite compatible with auto manufacturing requirements.

PA6 has a high chemical resistance and is commonly used as the matrix resin to produce fiber reinforced parts for engine compartment and other interior parts on automobiles. One issue of potential concern with PA6 is moisture regain, which can be as high as 8%. This concern is minimized in the present invention by the design of the composite article. For instance, in a 2-ply prepreg a PA6 resin layer (103) will be substantially encapsulated between the fiber rich layers (102) of PA11 during the thermoforming process, effectively sealing the PA6 layer from moisture exposure. PA11 has a very low moisture regain of less than 2%.

Example 5

A prepreg was made consisting of a fiber rich layer of Kevlar® having a S-100 Ionomer surface treatment agent applied and a resin rich layer of Ionomer 1707 thermoplastic resin.

Para-aramid Kevlar® fiber, from DuPont Company, was woven as a plain weave fabric with a areal weight of 260 g/m$^2$. The fabric was washed and dried.

The Kevlar® fabric was dip-coated into a bath containing a nano-particle aqueous dispersion of S-100 Ionomer to intimately coat the fibers in the fabric and act as a surface treatment agent to bond the fabric to the ionomer.

The dip-coated fabric was dried to produce a fabric coated with a maximum of 15% by volume of resin. (Maximum single-path coating was 15 volume percent). The fabric was first dried at 50° C. to remove water and subsequently at 120° C. to bond S-100 onto fibers.

A 50 micrometer thick coating of Ionomer 1707 (Mitsui Chemical) was 1707 adhered strongly to the Kevlar fabric surface.

A single ply of the Kevlar/Ionomer prepreg was applied onto a carbon-epoxy composite substrate surface. The prepreg was laid up onto the substrate surface and held at 1 atmosphere pressure while heating the prepreg to melt bond onto the surface. Application of the prepreg to the carbon-epoxy surface improved the impact damage tolerance of the carbon-epoxy composite.

Example 6

A Kevlar 29 plain weave fabric with an areal density of 260 g/m$^2$ was dip coated with UA-310 thermoplastic polyurethane dispersion and dried at 50° C. to remove water. The TPU was dried at 180° C. to melt onto the fabric producing a fabric coating with 20% volume resin.

An additional 50 micrometer thick thermoplastic polyurethane film was laminated to one side of the pretreated Kevlar.

The thermoplastic polyurethane film side of the prepreg face was placed onto a carbon-epoxy 24 ply composite plate and held under a vacuum bag while heated to 180° C. to consolidate the prepreg onto the carbon-epoxy plate surface.

Quasi-static punch shear tests on the prepreg backed and baseline carbon-epoxy plates showed the Kevlar prepreg absorbed 29% more energy then than the baseline. Adhesion is measured in the application such as the bond strength between resin and fiber that improves the impact resistance or delamination resistance.

A typical measurement is done by making the prepreg into a consolidated composite sample and measuring the mechanical properties such as tensile, modulus, impact resistance, 3 point delamination.

Example 7

The same Kevlar 29 plain weave fabric used in Example 6 without the surface treatment agent coating was directly laminated with 75 micrometer thick thermoplastic polyurethane film (as used in Example 6) to form a prepreg. Note that the film thickness was adjusted so that the total % volume resin was the same for the prepreg made in Example 6 and Example 7.

The thermoplastic polyurethane film side of the prepreg face was placed onto a carbon-epoxy 24 ply composite plate and held under a vacuum bag while heated to 180° C. to consolidate the prepreg onto the carbon-epoxy plate surface.

Quasi-static punch shear tests on the prepreg backed epoxy plate showed the Kevlar prepreg without pretreatment absorbed 20% less energy than the prepreg made using this invention. The prepreg made by direct lamination, a conventional prepreg manufacturing method, has poor bonding strength between the resin and the high tenacity fiber.

Example 8

Vectran HT plain weave fabric was dip coat treated with an Ionomer S-100 dispersion. The fabric was dried at 50° C. and than further dried at 220° C. to bond the Ionomer to the fibers. The fabric with ionomer coating was laminated with a 50 micrometer Ionomer 1707 film at 200° C. and pressure to make a prepreg by this invention.

The prepreg was laid-up in a 0/90 orientation in a 40 ply stack and consolidated at 100 psi as 200° C. into a final composite plate that was 24 inches by 24 inches and having a thickness of 0.5 inches.

A second plate was made using the Vectran HT plain weave fabric without the ionomer coating the was laminated with a 50 micrometer ionomer 1707 film at 200° C. and pressure to make a prepreg. The second prepreg was laid-up in a 0/90 orientation in a 40 ply stack and consolidated at 100 psi and 200° C. into a final composite plate that was 24 inches by 24 inches and having a thickness of 0.5 inches.

The two plates were tested for high velocity impact $V_{50}$ ballistic performance using MIL STD 662F test method. After testing the plates were inspected. The first plate made with the prepreg having a surface treatment agent on the fibers had impact damage and delamination of a 5 inch diameter wide in the plate for each ballistic impact.

The second plate made from prepreg made by a conventional method had severe delamination throughout and covering 95% of the 24" plate.

The delamination damage for the prepreg plate from the invention was 4.3% of the plate compared to 100% of the plate for the conventional prepreg, demonstrating a major improvement in bonding between the fibers and resin in the pretreated plate.

What is claimed is:

1. A prepreg comprising:
   a) a first layer comprising a top and bottom, wherein the first layer comprises a fabric made from high tenacity fibers coated with a surface treatment agent and a thermoplastic polymer matrix resin;
   b) a second layer comprising a top and bottom, wherein the second layer comprises a core thermoplastic resin having a higher melt temperature than the polymer matrix resin in the first layer, wherein the bottom of the first layer is adhered to the top of the second layer,
   wherein the polymer matrix resin has a melt flow index greater than the core thermoplastic resin.

2. The prepreg of claim 1, wherein the surface treatment agent is melted on the surface of the fibers as a result of exposure to a heat treatment process above the melt temperature of the surface treatment agent.

3. The prepreg of claim 1, wherein the polymer matrix resin is melted on the surface of the fibers as a result of exposure to a heat treatment process above the melt temperature of the polymer matrix resin.

4. The prepreg of claim 1, wherein the surface treatment agent and polymer matrix resin are melted on the surface of the fibers as a result of exposure to a heat treatment process above the melt temperature of the surface treatment agent and above the melt temperature of the polymer matrix resin.

5. The prepreg of claim 4, wherein the heat treatment process temperature is below the degradation temperature of the fibers.

6. The prepreg of claim 1, wherein the article is substantially free of surfactant as a result of exposure to a heat treatment process above the decomposition temperature of the surfactant where the surfactant decomposes during the heat treatment process.

7. The prepreg of claim 1, wherein the high tenacity fibers comprises a compound selected from the group consisting of polyarylate, liquid crystalline polyarylate, poly-p-benzamide, poly-paraphenylene terephthalamide, poly-(p-phenylene-2,6-benzobisoxazole), meta-linked aromatic polyamide, carbon, glass, silicone carbide, basalt or high density polyethylene fiber.

8. The prepreg of claim 1, wherein the surface treatment agent comprises one or more compounds selected from the group consisting of polyamide/epoxidized styrene-butadiene block copolymer, EMMA (ethylene-methyl methacrylate copolymer), EMMA ionomer, ethylene glycidyl methacrylate copolymer, co-polypropylene, co-polyester, polyethylene terephthalate, epoxy, polymethacrylate iso-butylester, polymethacrylic n-butylester, butyl methacrylate-styrene, copolymer, polymethylmethacrylate, polyamide, co-polyamide, polyvinyl acetate, polyvinyl alcohol, polyethylene, polyurethane, thermoplastic polyether polyurethane and polyetheretherketone.

9. The prepreg of claim 1, wherein the polymer matrix resin comprises a compound selected from the group consisting of thermoplastic polymers including of polyethylene, polypropylene, polyethylene terephthalate, ionomer, polyamide, polyurethane, polyethylmethacrylate, polymethylmethacrylate, polycarbonate, polystyrene, polyetherketone (PEK, PEKK, PEEK), polyether sulfone, polyphenylene sulfide, polyester amide, polyetherimide and polyimide.

10. A prepreg of claim 1, wherein the mean particle size of the surface treatment agent is less than about 1 micron.

11. A prepreg of claim 1, wherein the mean particle size of the polymer matrix resin is less than about 200 microns.

12. The prepreg of claim 1, wherein the core thermoplastic resin comprises a compound selected from the group consisting of polyethylene, polypropylene, polystyrene, polyethylene terephthalate, polyamide, thermoplastic polyurethane, polyethylmethacrylate, polymethylmethacrylate, polycarbonate, polyethersulfone, polyetherimide, thermoplastic polyimide, polyphenylenesulfide and polyethers.

13. A composite part comprising the prepreg of claim 1.

14. A 2-ply prepreg comprising:
   a) a first prepreg of claim 1 comprising a top and a bottom, wherein the top comprises the fiber layer and the bottom comprises the core thermoplastic resin layer; and
   b) a second prepreg of claim 1 comprising a top and a bottom, wherein the top comprises the fiber layer and the bottom comprises the core thermoplastic resin layer, wherein the bottom of the first prepreg is adhered to the bottom of the second prepreg.

15. A composite part comprising the prepreg of claim 14.

* * * * *